United States Patent
Baudu et al.

(10) Patent No.: US 12,196,265 B2
(45) Date of Patent: Jan. 14, 2025

(54) ROTATING ASSEMBLY, IN PARTICULAR FOR GUIDING A MOTOR VEHICLE WHEEL

(71) Applicant: NTN-SNR ROULEMENTS, Annecy (FR)

(72) Inventors: Alexandre Baudu, Annecy (FR); Vincent Pourroy-Solari, Thones (FR); Siegfried Ruhland, Annecy (FR)

(73) Assignee: NTN-SNR ROULEMENTS, Annecy (FR)

(*) Notice: Subject to any disclaimer, the term of this patent is extended or adjusted under 35 U.S.C. 154(b) by 0 days.

(21) Appl. No.: 17/759,287

(22) PCT Filed: Jan. 25, 2021

(86) PCT No.: PCT/EP2021/051628
§ 371 (c)(1),
(2) Date: Jul. 21, 2022

(87) PCT Pub. No.: WO2021/148676
PCT Pub. Date: Jul. 29, 2021

(65) Prior Publication Data
US 2023/0148290 A1    May 11, 2023

(51) Int. Cl.
*F16C 33/58*    (2006.01)
*F16C 19/18*    (2006.01)
(Continued)

(52) U.S. Cl.
CPC .......... *F16C 33/585* (2013.01); *F16C 19/185* (2013.01); *F16C 19/505* (2013.01);
(Continued)

(58) Field of Classification Search
CPC .... F16C 19/184; F16C 19/185; F16C 19/186; F16C 19/187; F16C 19/505; F16C 33/414;
(Continued)

(56) References Cited

U.S. PATENT DOCUMENTS 8,092,096 B2    1/2012    Shibata et al.
8,256,967 B2    9/2012    Langer et al.
(Continued)

FOREIGN PATENT DOCUMENTS

DE    102007016427 A1    10/2008
FR    3003201 A1    9/2014
(Continued)

OTHER PUBLICATIONS

International Search Report and Written Opinion mailed Apr. 23, 2022, in connection with International Patent Application No. PCT/EP2021/051627, filed Jan. 25, 2021, 12 pgs. (including translation).
(Continued)

*Primary Examiner* — James Pilkington
(74) *Attorney, Agent, or Firm* — Chiesa Shahinian & Giantomasi PC

(57) ABSTRACT

A motor vehicle drive wheel assembly comprising a fixed subassembly comprising two outer raceways; and, a rotating subassembly comprising a first inner race, a second inner race and two rows of balls arranged in two pitch planes PP1 and PP2. The second inner bearing race has an outer diameter, measured in a section plane perpendicular to the axis of rotation and located between the first pitch plane and the second pitch plane, at a measurement distance DM of the first pitch plane, which is greater than a given threshold value VS.

20 Claims, 6 Drawing Sheets

(51) Int. Cl.
*F16C 19/50* (2006.01)
*F16C 33/41* (2006.01)
*F16C 33/60* (2006.01)

(52) U.S. Cl.
CPC .......... *F16C 33/414* (2013.01); *F16C 33/583* (2013.01); *F16C 33/60* (2013.01); *F16C 2240/80* (2013.01); *F16C 2326/02* (2013.01)

(58) Field of Classification Search
CPC ... F16C 33/583; F16C 33/585; B60B 27/0005
See application file for complete search history.

(56) References Cited

U.S. PATENT DOCUMENTS

| | | | |
|---|---|---|---|
| 8,282,288 B2 * | 10/2012 | Dlugai | F16C 35/06 384/589 |
| 8,439,572 B2 | 5/2013 | Fischer et al. | |
| 8,777,491 B2 * | 7/2014 | Wang | B60B 27/0005 384/480 |
| 2010/0119185 A1 | 5/2010 | Fischer et al. | |
| 2023/0063439 A1 * | 3/2023 | Baudu | B60B 27/0042 |

FOREIGN PATENT DOCUMENTS

| | | |
|---|---|---|
| FR | 3052104 A1 | 12/2017 |
| JP | 2010-159011 A | 7/2010 |
| JP | 2013-018478 A | 1/2013 |
| WO | WO-2012176849 A1 * | 12/2012 ......... B60B 27/0005 |

OTHER PUBLICATIONS

International Search Report and Written Opinion mailed Jun. 2, 2022, in connection with International Patent Application No. PCT/EP2021/051628, filed Jan. 25, 2021, 11 pgs. (including translation).

Non-Final Office Action mailed Jan. 31, 2024 in connection with U.S. Appl. No. 17/759,284, filed Jul. 21, 2022, 15 pgs.

* cited by examiner

ROTATING ASSEMBLY, IN PARTICULAR FOR GUIDING A MOTOR VEHICLE WHEEL

CROSS-REFERENCE TO RELATED APPLICATIONS

This application is a national stage under 35 U.S.C. 371 of International Patent Application Serial No. PCT/EP2021/051628, filed Jan. 25, 2021, which claims priority to: (i) French Patent Application No. 2000720, filed Jan. 24, 2020; and (ii) French Patent Application No. 2007750, filed Jul. 23, 2020; the disclosures of all are incorporated herein by reference in their entirety.

TECHNICAL FIELD OF THE INVENTION

The invention relates to a rotating assembly, and in particular to a rotating assembly suitable for guiding a wheel, in particular a drive wheel, of a motor vehicle.

STATE OF THE PRIOR ART

A motor vehicle drive wheel assembly, once mounted on the vehicle, generally comprises a fixed subassembly intended to be secured to a suspension element of the vehicle and comprising a first outer raceway and a second outer raceway defining an axis of rotation; a rotating subassembly, capable of rotating relative to the fixed member about the axis of rotation, and comprising a wheel hub, a transmission bowl, a first inner raceway located opposite the first outer raceway, a second inner raceway located opposite the second outer raceway; and balls, forming a first row of balls between the first outer raceway and the first inner raceway and a second row of balls between the second outer raceway and the second inner raceway. The wheel hub has an attachment interface for a wheel rim and a brake disc. The assembly therefore typically has a stack of technical functions, arranged along the axis of rotation from the inside to the outside of the vehicle: transmission of torque, attachment to the suspension of the vehicle, guidance in rotation, braking and rolling, which requires a large size in the axial direction, that is to say, transverse in the coordinate system of the vehicle.

It has been proposed in document FR 3,052,104 to shrink an inner bearing race for the second inner raceway onto the transmission bowl, which makes it possible to reduce the axial size for a given distance between the two rows of balls, while increasing the pitch diameter of the row of balls located on the inside of the vehicle. Insofar as the payload and the camber stiffness are increasing functions of the distance between the two rows of balls and of the pitch diameter of the rows of balls, this architecture provides a solution for reconciling reduced axial bulk and good performance in terms of payload and camber stiffness.

Electric and hybrid vehicle powertrains often turn out to be bulkier than combustion engine powertrains in the width direction of the vehicle at the drive wheels, which leads to shortening of the transverse drive shafts. This shortening is undesirable because it leads to greater deflection angles in the transmission joints during movements of the wheel relative to the chassis. In this context, any measure making it possible to increase the space available for the transverse transmission shafts, even slightly, is desirable. There is therefore an increased need for compactness of drive wheel assemblies in the axial direction, which does not come at the expense of performance, in particular in terms of payload and rigidity.

DISCLOSURE OF THE INVENTION

The invention aims to provide a rotating assembly, for example for guiding a motor vehicle drive wheel, which combines axial compactness, high payload and a good level of camber stiffness.

To do this, proposed according to a first aspect of the invention is a rotating assembly, comprising:
- an outer subassembly comprising a first annular outer raceway and a second annular outer raceway centered on a common axis of rotation;
- an inner subassembly comprising a first inner bearing race on which a first inner raceway is formed, the first inner raceway having a raceway bottom diameter DI1, and a second inner bearing race on which a second inner raceway is formed, the second inner raceway having a raceway bottom diameter DI2 larger than the raceway bottom diameter DI1 of the first inner raceway, the second inner bearing race and the first inner bearing race being fixed relative to each other; and
- balls forming a first row of balls capable of rolling on the first outer raceway and the first inner raceway and a second row of balls capable of rolling on the second outer raceway and the second inner raceway for guiding the outer subassembly and the inner subassembly relative to each other in rotation about the axis of rotation, the balls of the first row of balls having a diameter DC1, a first pitch plane containing the centers of the balls of the first row of balls being located at a non-zero distance L from a second pitch plane containing the centers of the balls of the second row of balls;

According to the invention, the second inner bearing race has an outer diameter ($\phi$), measured in a section plane perpendicular to the axis of rotation and located between the first pitch plane and the second pitch plane, at a measurement distance DM from the first pitch plane, which is greater than a given threshold value VS, where:

$$\begin{cases} DM = 1.25 \times \dfrac{DC1}{2} \\ VS = sup\left(1.1 \times DI1; DI1 + \dfrac{DC1}{2}\right) \end{cases}$$

These dimensional characteristics reflect the fact that the second inner bearing race carrying the second inner raceway is close to the first raceway and has a significant thickness near the first raceway, giving the inner subassembly a high stiffness and the rotating assembly a satisfactory axial compactness.

Preferably, the second inner bearing race comprises an axial end face facing axially toward the first pitch plane, axially bearing against a bearing face of the first inner bearing race, the axial end face being positioned in a transverse plane situated between the first pitch plane and the second pitch plane, at a distance D from the first pitch plane, preferably less than half the diameter DC1 of the balls of the first row of balls. Preferably, the axial end face is planar. It has an outside diameter that is preferably equal or substantially equal to that of the bearing face. The outer diameter of the axial end face is preferably greater than or equal to the raceway bottom diameter DI1. In practice, it is below the threshold value VS. In section in a plane containing the axis of rotation, the outer surface of the second inner bearing race, in the portion located between the axial end face and the section plane PC, is concave and the distance from a current point of this outer surface of the second inner bearing race to the axis of rotation increases continuously when the current point moves away from the axial end face and approaches the section plane PC.

For good control of the positioning of the balls of the first row of balls during mounting of the assembly or in use, a first one-piece bearing cage is preferably provided, the first one-piece bearing cage comprising a ring defining a reference axis of the first bearing cage and retaining claws distributed around the periphery of the ring to delimit the cells for housing the balls of the first row of balls.

The second inner bearing race occupies a volume in the immediate vicinity of the first raceway, which leaves little room to accommodate a cage whose ring would be located between the first pitch plane and the second pitch plane. Preferably, the ring is therefore positioned on one side of the first pitch plane opposite the second pitch plane, the retaining claws projecting from the ring in the direction of the second pitch plane by crossing the first pitch plane, the retaining claws having a free distal end, the cells each being delimited by two adjacent retaining claws among the retaining claws of the first one-piece cage and by a portion of the ring connecting the two adjacent retaining claws. The first cage then has no ring located between the first pitch plane and the second pitch plane close to the second inner bearing race. More space can be allocated for the second inner bearing race, to increase its outside diameter in the area between the axial end face and the section plane PC.

Preferably, the cells are enveloping, the claws enclosing the balls to prevent them from escaping during assembly. According to one embodiment, the two adjacent retaining claws for each of the cells each comprise a concave retaining guide facet facing the ball housed in the cell, the retaining guide facets preferably being located at least partially inside a first pitch cylinder having as its base a first pitch circle passing through the centers of the balls of the first row of balls and centered on the axis of rotation, the retaining guide facets preferably lying at least partially between the first pitch plane and the second pitch plane. Preferably, the ring portion connecting the two adjacent retaining claws comprises an end guide facet facing the ball housed in the cell, the end guide facet preferably being located at least partially radially outside the first pitch cylinder According to a first variant, the first bearing cage further comprises additional claws distributed around the periphery of the ring, each of the additional claws being associated with one of the retaining claws and having a free distal end located radially outside and opposite the associated retaining claw. Preferably, the two additional claws associated with the two adjacent retaining claws, for each of the cells, each comprise an additional concave guide facet facing the ball housed in the cell, the additional guide facets being located at least partially outside the first pitch cylinder and at least partially between the first pitch plane and the second pitch plane.

According to a second variant, it is provided that for each of the cells, the two adjacent retaining claws each comprise an additional concave guide facet facing the ball housed in the cell, the additional guide facets being located at least partially outside the first pitch cylinder and at least partially between the first pitch plane and the second pitch plane.

It is advantageous to provide means for stacking the cages for storage thereof before mounting the drive wheel assembly on an assembly line. To this end, provision can be made for the ring of the first bearing cage to further comprise a planar annular stacking face axially facing away from the retaining claws, and a centering bearing having a symmetry of revolution about the reference axis of the first bearing cage, the first bearing cage further comprising planar facets facing axially away from the annular stacking face, superimposed with the planar annular stacking face seen in orthogonal projection in a stacking plane containing the planar annular stacking face, and centering facets, turned radially opposite the centering bearing, so that, seen in orthogonal projection on the stacking plane, the centering facets face the centering bearing. The cages can thus be stacked while remaining centered, without the risk of them clinging to each other.

For good control of the positioning of the balls of the second row of balls during mounting of the assembly or in use, a second one-piece bearing cage is preferably provided comprising a ring defining a reference axis of the second bearing cage and retaining claws distributed around the periphery of the ring of the second bearing cage to delimit the cells for housing the balls of the second row of balls.

The second inner bearing race and the outer bearing race occupy a volume between the first pitch plane and the second pitch plane and in the immediate vicinity of the second raceway, which leaves little room to accommodate a cage whose ring would be located between the first pitch plane and the second pitch plane. Preferably, provision is therefore made for the ring of the second bearing cage to be positioned on a side of the second pitch plane opposite the first pitch plane, the retaining claws of the second bearing cage projecting from the ring of the second bearing cage toward the first pitch plane by crossing the second pitch plane, the retaining claws of the second bearing cage having a free distal end, the cells each being delimited by two adjacent retaining claws among the retaining claws of the second bearing cage and by a portion of the ring connecting the two adjacent retaining claws. The second cage then has no ring situated between the first pitch plane and the second pitch plane. More space can be allocated to the second inner bearing race, to increase its outer diameter, as well as to the outer bearing race to decrease its inner diameter between the first pitch plane and the second pitch plane.

According to a particularly advantageous embodiment, the balls forming the first row of balls have a ball diameter DC1 less than or equal to a ball diameter DC2 of the balls forming the second row of balls. The increased diameter of the balls of the second row makes it possible to reduce the distance between the two rows of balls, which limits the bending in the second inner bearing race, and therefore the risks of separation between the parts of the inner subassembly. The outer raceways are preferably enveloping in the axial direction, in the sense that they each have a raceway bottom, located in an intermediate axial position between the axial ends of the raceway.

According to one embodiment, the second inner bearing race is shrunk on a shrink-fit bearing of the first inner bearing race. Alternatively, the first inner bearing race and the second inner bearing race can be shrunk onto a common solid or hollow part.

The second inner bearing race is preferably a solid metal part, made for example from steel. Likewise, the first inner bearing race is preferably a solid metal part, made for example from steel.

The rotating assembly as described above is particularly suitable for guiding a vehicle wheel, in particular a drive wheel. According to one embodiment, the outer subassembly constitutes a fixed subassembly of a motor vehicle drive wheel guide, and the inner subassembly constitutes a rotating subassembly of the motor vehicle drive wheel guide, capable of rotating with respect to the fixed subassembly about the axis of rotation, the rotating subassembly comprising a wheel hub comprising a flange provided with an interface for attaching a wheel rim or a brake disc, the attachment flange forming a mounting face of the wheel rim or of the brake disc facing axially in a direction of disassembly of the wheel rim or of the brake disc, the direction of disassembly being parallel to the axis of rotation, the first inner bearing race being constituted by the wheel hub or shrunk on the wheel hub, the second inner bearing race being shrunk on a shrink-fit bearing of the wheel hub.

The first raceways and the first row of balls are intended, once the assembly has been integrated into the vehicle, to be further from a longitudinal median vertical plane of the vehicle than the second raceways and the second row of balls.

According to one embodiment, the rotating subassembly further comprises a transmission bowl, the inner bearing race bearing against the transmission bowl at an annular contact interface extending at least in a radial direction relative to the axis of rotation. Preferably, the annular contact interface is positioned at least partially, and preferably completely, between the first pitch plane and the second pitch plane, which contributes to the great compactness of the rotating assembly.

The second inner bearing race has a specific geometry, which makes it possible to position the second inner raceway radially outside the first inner raceway, and to house part of the transmission bowl, including the annular bearing surface, in a recess formed by the inner bearing race.

Preferably, the wheel hub is a solid one-piece metal part, which contributes to greater rigidity of the assembly. Alternatively, the hub can be a solid one-piece bi-material part, for example a steel/aluminum or steel/composite material combination.

Where appropriate, the rotating subassembly further comprises a brake disc bearing on the mounting face, a wheel rim bearing on the brake disc and elements for attaching the wheel rim and the brake disc to the attachment flange.

BRIEF DESCRIPTION OF FIGURES

Other features and advantages of the invention will come to light on reading the following disclosure, with reference to the appended figures.

For greater clarity, identical or similar elements are identified by identical reference signs in all of the figures.

DETAILED DESCRIPTION OF EMBODIMENTS

Figure 1:
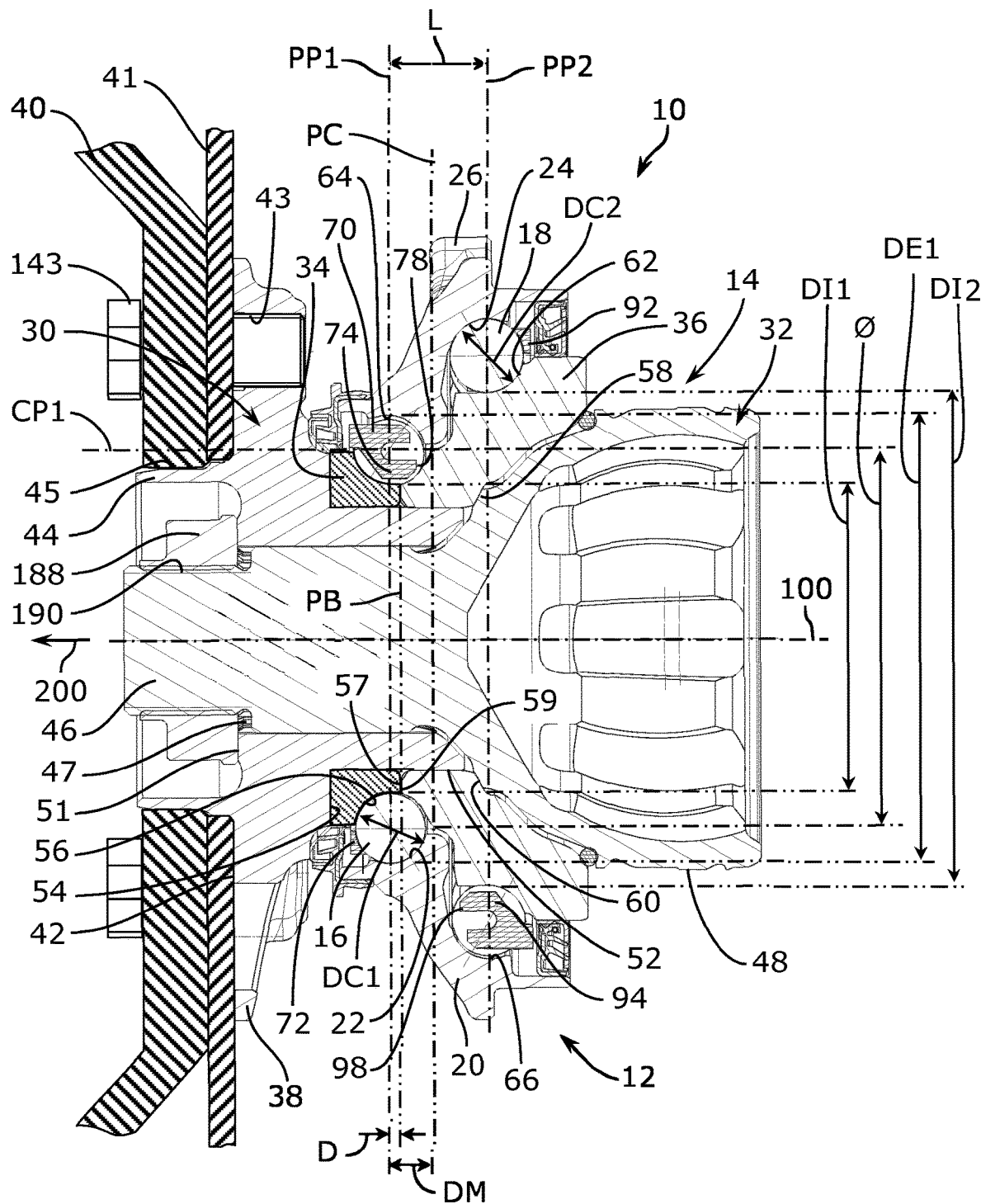
FIG. 1 is a longitudinal sectional view of a rotating assembly for guiding a motor vehicle drive wheel according to a first embodiment of the invention.

FIG. 1 shows a rotating assembly for guiding a motor vehicle drive wheel 10, comprising a fixed outer subassembly 12, intended to be secured to a suspension member of a motor vehicle (not shown) and defining an axis of rotation 100, an inner rotating subassembly 14, capable of rotating about the axis of rotation 100 inside the fixed outer subassembly 12, and guide balls 16, 18 between the rotating subassembly 14 and the fixed subassembly 12.

The fixed outer subassembly 12 here is constituted by a one-piece solid metal outer race 20 on which a first outer raceway 22 and a second outer raceway 24, coaxial, are formed that define the axis of rotation 100. The outer race further comprises at least one attachment clamp 26 extending radially outward, in which bores (not shown in this figure) are formed for attaching the attachment clamp 26 to a suspension member, via attachment elements (not shown).

The inner rotating subassembly 14 comprises a wheel hub 30, a transmission bowl 32, an optional first inner bearing race 34, and a second inner bearing race 36.

The wheel hub 30 is a solid one-piece metal part, which comprises a flange 38 for attaching a drive wheel rim 40 and a brake disc 41. The flange 38 has a face 42 bearing the brake disc 41, and is provided with attachment bores 43, allowing the insertion of attachment elements 143 of the rim 40 and of the brake disc 41.

The wheel hub 30 also has a centering skirt 44 that projects axially with respect to the planar bearing face 42, in a direction 200 of disassembly of the wheel rim 40 and of the brake disc 41, and has a centering bearing 45, preferably stepped, facing radially outward, comprising a first cylindrical portion for centering the wheel rim 40 and a second cylindrical portion, of equal or greater diameter, for centering the brake disc 41 during assembly. The centering bearing 45 is not necessarily intended to remain in contact with the rim 40 and the brake disc 41 after assembly.

The transmission bowl 32 is a solid one-piece metal part, which has a protruding end portion 46 and a flared middle portion 48 delimiting a cavity 50 of constant velocity joint. The protruding portion 46 of the transmission bowl 32 is preferably splined and mounted free, fitted or shrunk in a splined tubular cavity 47 of the wheel hub 30, forming a splined contact interface. Furthermore, FIG. 1 shows means for attaching the transmission bowl 32 and the wheel hub 30, which for example implement a nut 188 screwed to a threaded end 190 of the protruding portion 46, and bearing against a shoulder 84 of the wheel hub 30.

The first inner bearing race 34 is shrink-fitted on a cylindrical shrink-fit bearing 52 of the wheel hub 30, bearing axially against an annular shoulder 54 formed on the wheel hub 30. A first inner raceway 56 is formed on the first inner bearing race 34 facing the first outer raceway 22.

The second inner bearing race 36 is also shrunk on the cylindrical shrink-fit bearing 52 of the wheel hub 30, with a transverse end face 57 bearing axially against a transverse face 59 of the first inner bearing race 34. The second inner bearing race 36 has an annular abutment face 58, here frustoconical but which may be flat, axially facing away from the first inner raceway 56, and axially protruding relative to the wheel hub 30, so as to bear against an annular bearing face 60 formed on the transmission bowl 32. A second inner raceway 62 is formed on the second inner bearing race 36 opposite the second outer raceway 24. The balls 16, 18 form, on the one hand, a first row of balls 16 that roll on the first outer raceway 22 and the first inner raceway 56 and, on the other hand, a second row of balls 18 that roll on the second outer raceway 24 and the second inner raceway 62.

For the rest of the description, we will focus on certain remarkable dimensional characteristics of the assembly, which require some preliminary definitions. Thus, we note:
- PP1, the pitch plane where the pitch circle is located constituting the trajectory of the centers of the balls 16 of the first row of balls with nominal dimensions;
- PP2, the pitch plane where the pitch circle is located constituting the trajectory of the centers of the balls 18 of the second row of balls with nominal dimensions;
- DP1, the diameter of the pitch circle of the first row of balls 16;
- DP2, the diameter of the pitch circle of the second row of balls 18;
- CP1, a pitch cylinder centered on the axis of rotation 100 and having as its base the pitch circle of the first row of balls 16;
- DC1, the diameter of the balls 16 of the first row of balls;
- DC2, the diameter of the balls 18 of the second row of balls;
- DI1, a raceway bottom diameter of the first inner raceway 56, defined as the smallest diameter of the raceway 56;
- DI2, a raceway bottom diameter of the second inner raceway 62, defined as the smallest diameter of the raceway 62;
- DE1, a raceway bottom diameter of the first outer raceway 22, defined as the largest diameter of the outer raceway 22;
- PB, a plane perpendicular to the axis of rotation 100 and tangent to the axial end face 57 of the second inner bearing race 36;
- D, the distance between the plane PB and the first pitch plane PP1.

The first pitch plane PP1 is located at a non-zero distance L from the second pitch plane PP2. Remarkably, the raceway bottom diameter DI2 of the second inner raceway 62 is larger than the raceway bottom diameter DI1 of the first inner raceway 56, and preferably larger than the raceway bottom diameter DE1 of the first outer raceway 22. The second inner bearing race 36 therefore has a shape that flares out in the direction opposite the direction of disassembly, from the axial end face 57, which makes it possible to accommodate part of the transmission bowl 32 inside the second inner bearing race 36. The second inner bearing race 36 is housed in a cramped volume of generally frustoconical contour, between the outer bearing race 20 and the transmission bowl 32. To give the second inner bearing race 36 a high stiffness, provision is made for the outer diameter of the inner bearing race 36, measured radially with respect to the axis of rotation 100, to increase rapidly as one moves away from the axial end face 57.

This increase in diameter can be characterized by observing the outer diameter $\phi$ of the second inner bearing race 36 in a section plane PC perpendicular to the axis of rotation 100 and located between the first pitch plane PP1 and the second pitch plane PP2, at a measurement distance DM from the first pitch plane PP1 such that $$DM = 1.25 \times \frac{DC1}{2}$$

Characteristically, the outer diameter $\phi$ is greater than a threshold value VS, which is equal to the greater of two values corresponding respectively to 110% of the raceway bottom diameter DI1 of the first inner raceway 56 and to the sum of the raceway bottom diameter DI1 of the first inner raceway 56 and of the radius of the balls 16 of the first row of balls:

$$\begin{cases} \phi > VS \\ VS = sup\left(1.1 \times DI1; DI1 + \frac{DC1}{2}\right) \end{cases}$$

The plane PB, in which the contact interface between the axial end face 57 and the annular bearing face 59 is located, is preferably located between the first pitch plane PP1 and the second pitch plane PP2, at a distance D from the first pitch plane PP1 preferably less than half the diameter DC1 of the balls 16 of the first row of balls. This positioning contributes to great axial compactness and excellent rigidity of the assembly 10.

Figure 2:
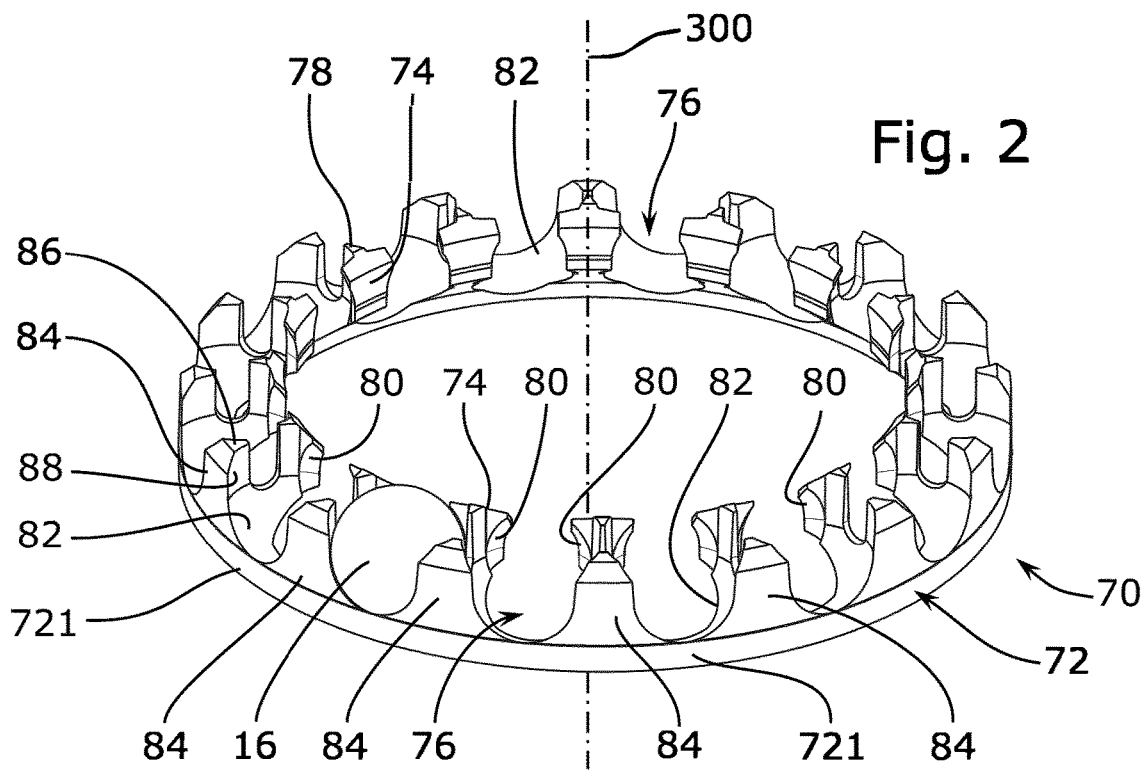
FIG. 2 is an isometric view of a bearing cage of the rotating assembly of FIG. 1.

The balls 16 of the first row of balls are guided in the volume between the first inner raceway and the first outer raceway by a first one-piece bearing cage 70, illustrated in detail in FIG. 2, comprising a ring 72 defining a reference axis 300 of the first cage 70 and retaining claws 74 distributed around the periphery of the ring 72 to delimit cells 76 for housing the balls 16 of the first row of balls. The reference axis 300 of the first bearing cage 70 is intended to coincide with the axis of rotation 100 when the rotating assembly 10 is in a reference position.

The rapid increase in the outer diameter of the second inner bearing race 36 in the immediate vicinity of the first inner raceway 56 results in a reduced volume to position the first bearing cage 70. In order to maximize the volume available for the second inner bearing race 36 in the space located between the first pitch plane PP1 and the second pitch plane PP2, provision is advantageously made for the ring 72 of the first bearing cage to be positioned on a side of the first pitch plane PP1 opposite the second pitch plane PP2. The retaining claws 74 extend from the ring toward the second pitch plane PP2 crossing the first pitch plane PP1. The first cage therefore has no ring located between the first pitch plane PP1 and the second pitch plane PP2, so that the retaining claws 74 have a free distal end 78. The cells 76 are each delimited by two adjacent retaining claws 74 among the retaining claws of the first bearing cage 70 and by a portion of the ring 72 connecting the two adjacent retaining claws 74.

For each of the cells 76, the two adjacent retaining claws 74 each comprise a concave retaining guide facet 80 facing the ball 16 housed in the cell 76, and the ring portion 721 connecting the two adjacent retaining claws 74 comprises an end guide facet 82 facing the ball 16 housed in the cell. The end guide facet 82 is located at least partially radially on the outside of a first pitch cylinder CP1 whose base is the pitch circle of the first row of balls 16 and centered on the axis of rotation 100. The retaining guide facets 80 are located at least partially inside the first pitch cylinder CP1 and at least partially between the first pitch plane PP1 and the second pitch plane PP2.

In this embodiment, the first bearing cage 70 further comprises additional claws 84 distributed around the periphery of the ring 72, each of the additional claws 84 being associated with one of the retaining claws 74 and having a free distal end 86 located radially outside and facing the associated retaining claw 74. For each of the cells, the two additional claws 84 associated with the two adjacent retaining claws 74 each comprise an additional concave guide facet 88 facing the ball 16 housed in the cell 76, the additional guide facets 88 being located at least partially outside the first pitch cylinder CP1 and at least partially between the first pitch plane PP1 and the second pitch plane PP2. An enveloping cage 70 is thus produced, in the sense that the balls 16 cannot be inserted into the cells and can only be extracted therefrom by elastically deforming the retaining claws 74 or the additional claws 84, or the retaining claws 74 and the additional claws 84 simultaneously. Thus, there is no risk of losing a ball during assembly.

Figure 3:
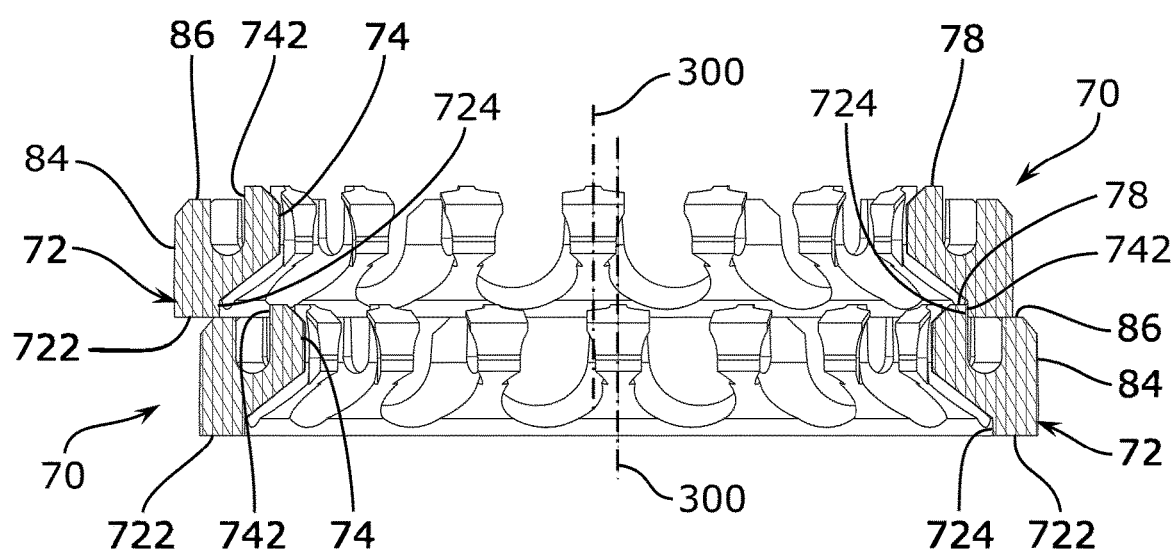
FIG. 3 illustrates two bearing cages similar to the cage of FIG. 2, stacked on top of each other before one of them is mounted in the assembly of FIG. 1.
Figure 6:
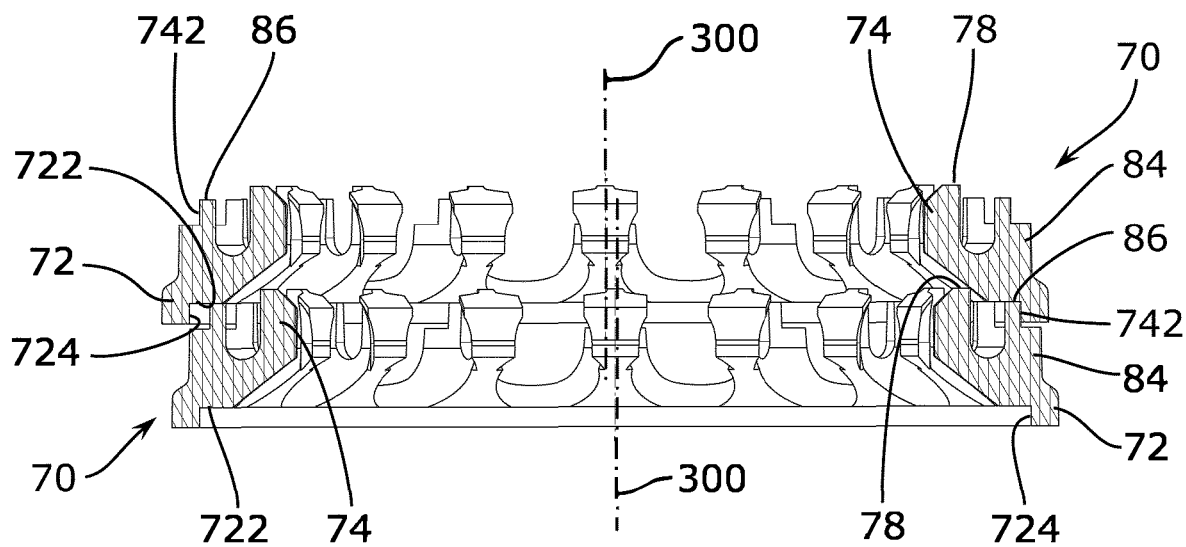
FIG. 6 illustrates two bearing cages similar to the cage of FIG. 5, stacked on top of each other before one of them is mounted in the assembly of FIG. 1 or of FIG. 4.

The ring 72 of the first bearing cage 70 comprises a planar annular stacking face 722 axially facing away from the retaining claws 74, and a centering bearing 724 having a symmetry of revolution about an axis of symmetry 300 of the first bearing cage 70. The free ends 86 of the additional claws 84 face axially away from the planar annular stacking face 722, superimposed with the planar annular stacking face 722 seen in orthogonal projection in a stacking plane containing the planar stacking face 722. The retaining claws 74 in turn comprise centering facets 742, facing radially away from the centering bearing 724, so that, seen in orthogonal projection in the stacking plane, the centering facets 742 face the centering bearing 724. Thus, when two bearing cages identical to the first one-piece bearing cage 70 are stacked on top of each other before they are mounted in the rotating assembly 10, as illustrated in FIGS. 3 and 6, the free ends 86 of the additional claws 84 of a bearing cage 70 bear against the annular stacking face 722 of the adjacent bearing cage 70, while the centering facets 742 come opposite the centering bearing 724, which ensures controlled relative positioning of the two bearing cages 70 and prevents them from becoming inextricably entangled.

The balls 18 of the second row of balls are guided in the volume between the second inner raceway 62 and the second outer raceway 24 by a second one-piece bearing cage 90, comprising a ring 92 defining a reference axis of the second cage and retaining claws 94 distributed around the periphery of the ring 92 to delimit cells for housing the balls 18 of the second row of balls.

In order to maximize the volume available for the second inner bearing race 36 and the outer bearing race 20 in the space located between the first pitch plane PP1 and the second pitch plane PP2, the ring 92 is preferably positioned on a side of the second pitch plane PP2 opposite the first pitch plane PP1. The retaining claws 94 protrude from the ring toward the first pitch plane PP1 while crossing the second pitch plane PP2. The retaining claws 94 have a free distal end 98, cells each being delimited by two adjacent retaining claws 94 among the retaining claws of the second bearing cage 90 and by a portion of the ring 92 connecting the two adjacent retaining claws 94. The second bearing cage 90 moreover has essentially the same configuration as the first bearing cage 70, naturally with dimensions adapted to the diameter of the balls 18 and to the pitch diameter of the second row of balls 18.

The outer raceways 22, 24 formed on the outer bearing race 20 are enveloping in the axial direction, in the sense that they each have a raceway bottom 64, 66, located in an intermediate position between the axial ends of the corresponding raceway 22, 24.

In this embodiment, the balls forming the first row of balls 16 have a diameter DC1 that is preferably less than or equal to the diameter DC2 of the balls forming the second row of balls 18. Choosing a relatively small diameter for the first row of balls 16 makes it possible to retain a sufficient axial thickness of the second inner bearing race 36 in the shrink-fit region on the wheel hub 30, close to the first row of balls 16, and to bring together the pitch planes PP1 and PP2. The choice of a larger diameter for the second row of balls 18 makes it possible to ensure good load resistance, while maintaining a relatively small distance between the two pitch planes PP1 and PP2.

Figure 4:
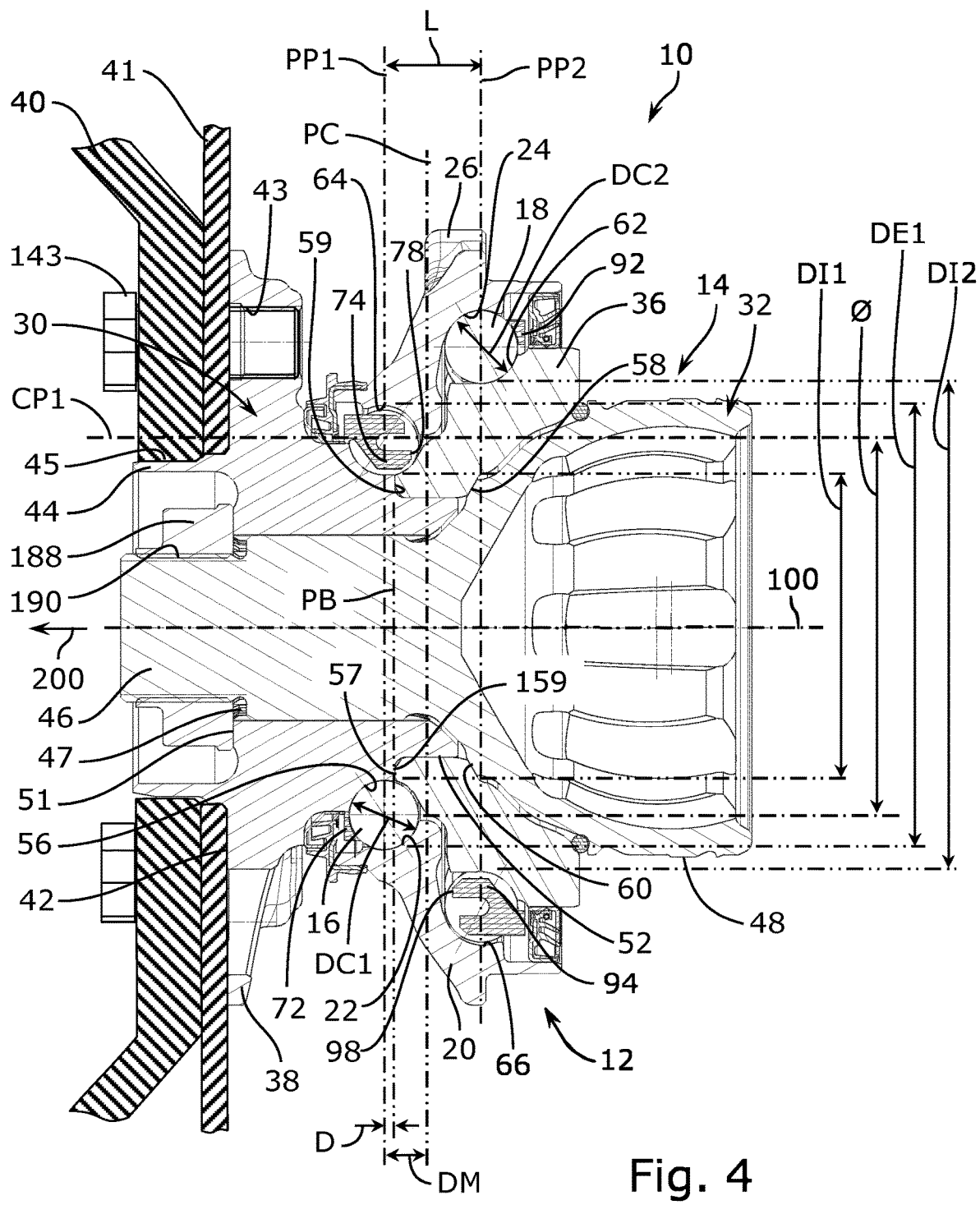
FIG. 4 is a longitudinal sectional view of a rotating assembly for guiding a motor vehicle drive wheel according to a second embodiment of the invention.

The embodiment of FIG. 4 differs from that of FIG. 1 in that the first inner raceway 56 is formed directly on the wheel hub 30, which thus constitutes the first inner bearing race 34 and has a shrink-fit bearing 52 and a shoulder 159. The second inner bearing race 36 is thus shrink-fitted on the shrink-fit bearing 52 and axially bears against the shoulder 159 of the wheel hub 30, and against the annular bearing face 60 of the transmission bowl 32.

Figure 5:
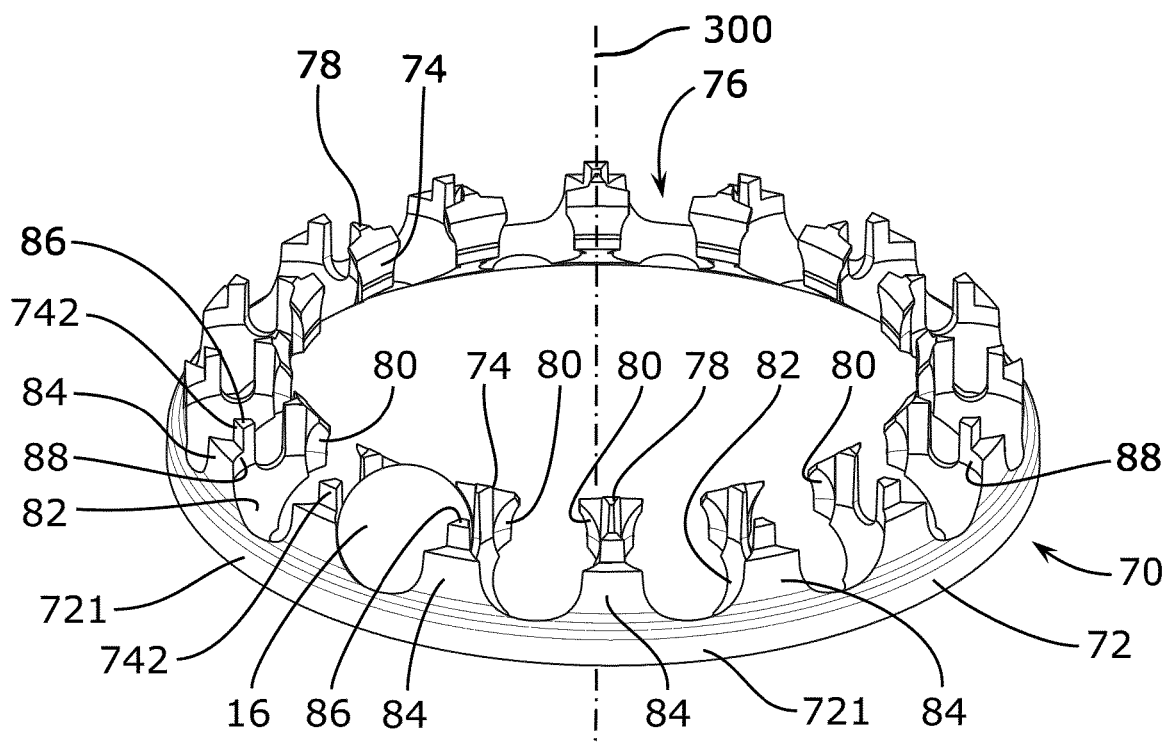
FIG. 5 is an isometric view of a bearing cage as a variant of the bearing cage of FIG. 2, for a rotating assembly according to FIG. 1 or according to FIG. 4.

FIGS. 5 to 6 show a variant of the first bearing cage 70, intended to equip the rotating assembly for guiding a drive wheel of a motor vehicle 10 of FIG. 1, or of FIG. 4. The first bearing cage 70 of FIGS. 5 and 6 differs from the preceding ones in particular by the positioning of the first stacking face 722, which is set back with respect to an axial end of the ring 72 of the bearing cage 70, and by positioning and centering facets 742, which are formed on the additional claws 84. FIG. 6 in particular shows the cooperation between the centering facets 742 and the centering bearing 724, and between the free ends 86 of the additional claws 84 and the annular stacking face 722 to allow stacking of the first bearing cages 70 on top of each other on an assembly line of the rotating assembly 10.

Figure 7:
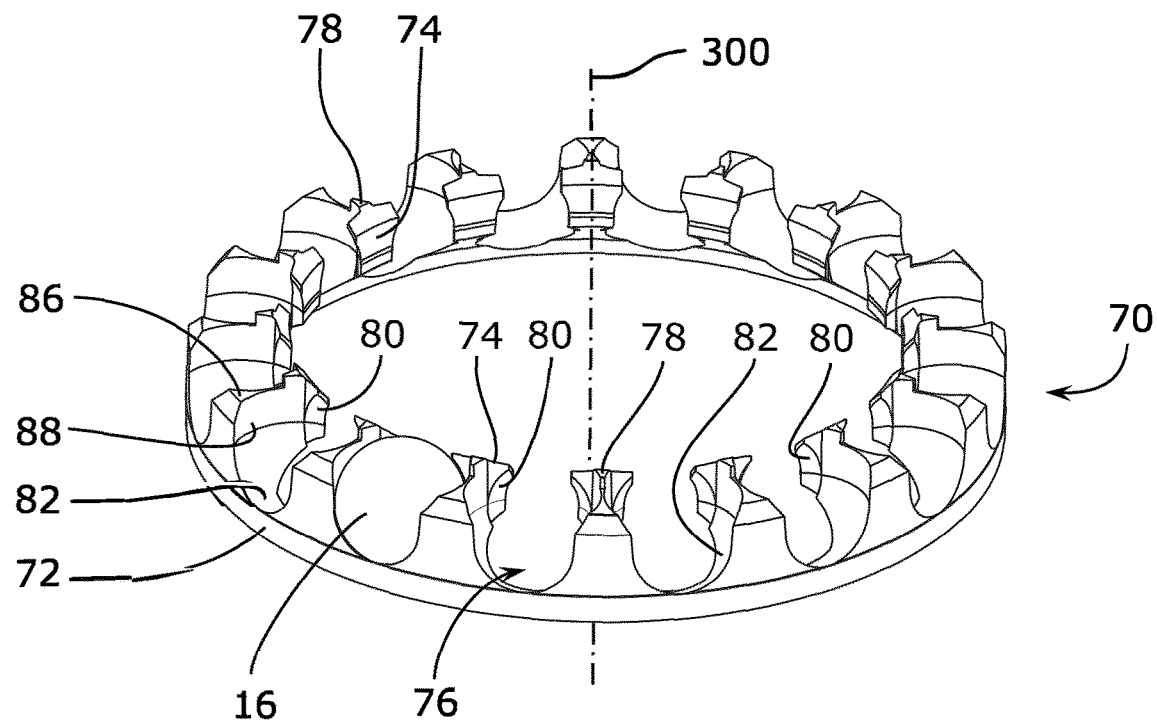
FIG. 7 is an isometric view of a bearing cage as a variant of the bearing cage of FIG. 2, for a rotating assembly according to FIG. 1 or according to FIG. 4.
Figure 8:
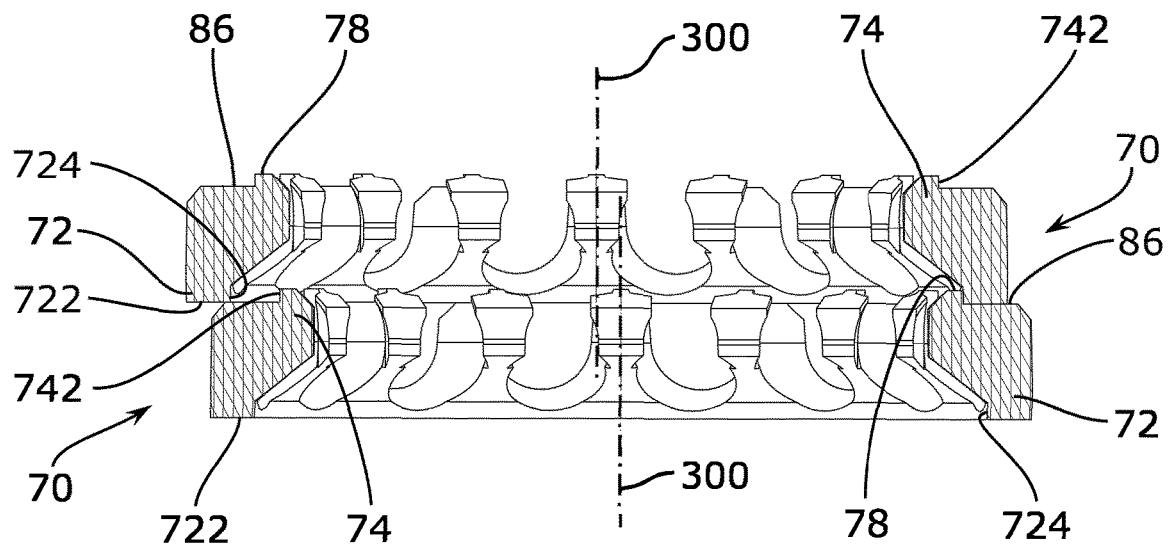
FIG. 8 illustrates two bearing cages similar to the cage of FIG. 7, stacked on top of each other before one of them is mounted in the assembly of FIG. 1 or of FIG. 4.

FIGS. 7 to 8 show another variant of the first bearing cage 70, intended to equip the rotating assembly for guiding a drive wheel of a motor vehicle 10 of FIG. 1, or of FIG. 4. The first bearing cage 70 of FIGS. 7 and 8 differs from the previous ones in that it comprises only one set of solid retaining claws 74, and no additional claws. The retaining claws 74 have retaining guide facets 80 that are intended to be located at least partially inside the first pitch cylinder CP1 and at least partially between the first pitch plane PP1 and the second pitch plane PP2, and additional guide facets 88 intended to be located at least partially outside the first pitch cylinder CP1 and at least partially between the first pitch plane PP1 and the second pitch plane PP2. An enveloping cage 70 is thus produced, in the sense that the balls 16 cannot be inserted into the cells and can only be extracted therefrom by elastically deforming the retaining claws 74. In the embodiments of FIGS. 5 to 8, the balls 16 are mounted in the first bearing cage 70 by a movement having either a zero radial component or a radial component oriented toward the reference axis 300.

Figure 9:
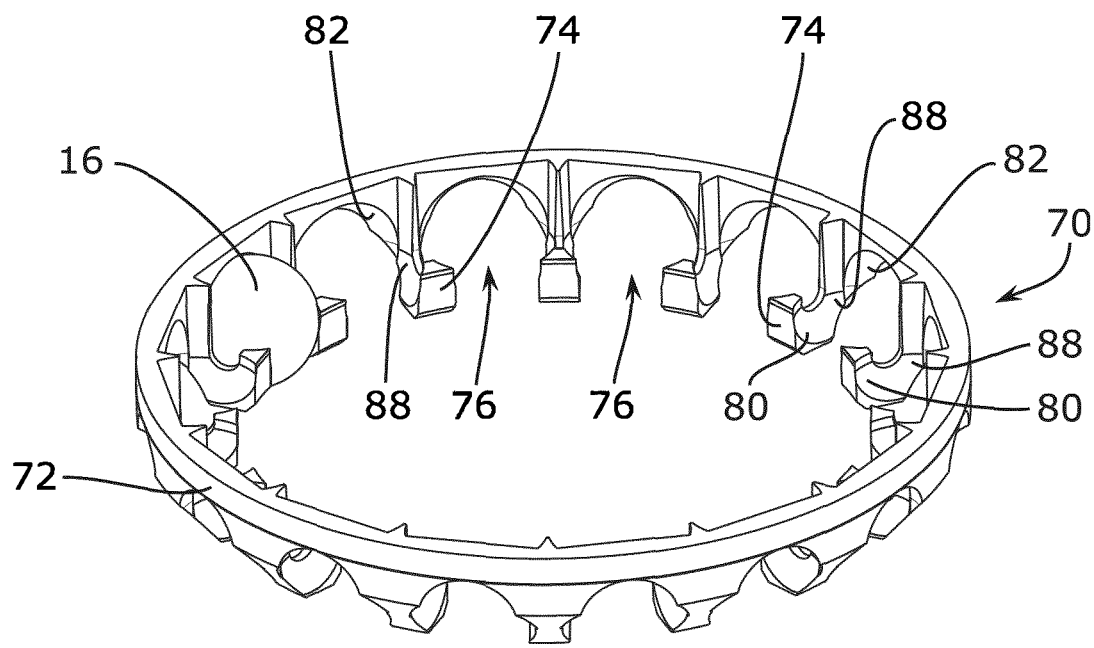
FIG. 9 is an isometric view of a bearing cage as a variant of the bearing cage of FIG. 2, for a rotating assembly according to FIG. 1 or according to FIG. 4.
Figure 10:
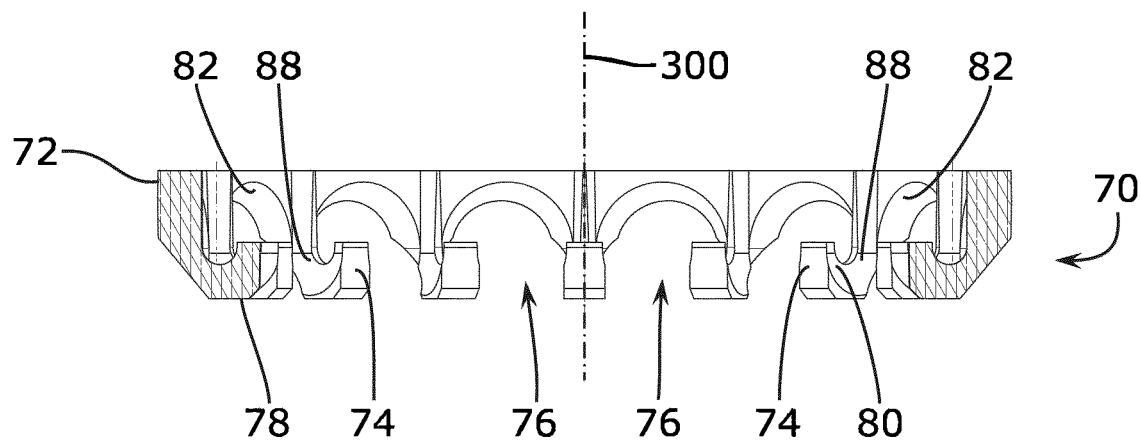
FIG. 10 illustrates two bearing cages similar to the cage of FIG. 9, stacked on top of each other before one of them is mounted in the assembly of FIG. 1 or of FIG. 4.

FIGS. 9 to 10 show another variant of the first bearing cage 70, intended to equip the rotating assembly for guiding a drive wheel of a motor vehicle 10 of FIG. 1, or of FIG. 4. The first bearing cage 70 of FIGS. 9 and 10 differs from the previous ones in that it comprises only one set of hook-shaped retaining claws 74, and no additional claws. The retaining claws 74 have retaining guide facets 80 that are intended to be located at least partially inside the first pitch cylinder CP1 and at least partially between the first pitch plane PP1 and the second pitch plane PP2, and additional guide facets 88 intended to be located at least partially outside the first pitch cylinder CP1 and at least partially between the first pitch plane PP1 and the second pitch plane PP2. An enveloping cage 70 is thus produced, in the sense that the balls 16 cannot be inserted into the cells and can only be extracted therefrom by elastically deforming the retaining claws 74. This embodiment of the first bearing cage 70 differs from the previous ones also in that the balls 16 are mounted in the bearing cage 70 by a movement having a radial component going from the inside toward the outside of the bearing cage 70.

In all embodiments, the second bearing cages 90 may be similar to the first bearing cages 70.

Alternatively, the balls 16, 18 of the two rows of balls may have the same diameter.

As a variant, it is possible to provide a fixed subassembly in several parts, with a clamp 26 in one or more parts forming the attachment clamp to a suspension element of the vehicle, and two coaxial outer bearing races shrunk in this clamp.

It is emphasized that all the features, as they will come to light for a person skilled in the art from the present description, the drawings and the attached claims, may be combined with other features or groups of features disclosed here, even if concretely these features have only been described in relation to other determined features, both individually and in arbitrary combinations, provided that this has not been expressly excluded or that technical circumstances make such combinations impossible or devoid of meaning.

Throughout the text of the present application, "fixed subassembly" has been used to refer to a subassembly that constitutes a fixed coordinate system for the rotation of the movable subassembly. Those skilled in the art will have understood that this subassembly is itself required to move relative to the body of the vehicle, depending on the geometry of the suspension interposed between the body of the vehicle and the fixed subassembly.

The invention claimed is:

1. A rotating assembly, comprising:
an outer subassembly comprising a first annular outer raceway and a second annular outer raceway centered on a common axis of rotation;
an inner subassembly comprising a first inner bearing race on which a first inner raceway is formed, the first inner raceway having a raceway bottom diameter DI1, and a second inner bearing race on which a second inner raceway is formed, the second inner raceway having a raceway bottom diameter DI2 larger than the raceway bottom diameter DI1 of the first inner raceway, the second inner bearing race and the first inner bearing race being fixed relative to each other; and
balls forming a first row of balls capable of rolling on the first outer raceway and the first inner raceway and a second row of balls capable of rolling on the second outer raceway and the second inner raceway for guiding the outer subassembly and the inner subassembly relative to each other in rotation about the axis of rotation, the balls of the first row of balls having a diameter DC1, a first pitch plane containing the centers of the balls of the first row of balls being located at a non-zero distance L from a second pitch plane containing the centers of the balls of the second row of balls; wherein
the second inner bearing race has an outer diameter, measured in a section plane perpendicular to the axis of rotation and located between the first pitch plane and the second pitch plane, at a measurement distance DM from the first pitch plane, which is greater than a given threshold value VS, where:

$$\begin{cases} DM = 1.25 \times \dfrac{DC1}{2} \\ VS = sup\left(1.1 \times DI1; DI1 + \dfrac{DC1}{2}\right) \end{cases}.$$

2. The rotating assembly of claim 1, wherein the second inner bearing race comprises an axial end face facing axially toward the first pitch plane, and axially bearing against a bearing face of the first inner bearing race, the axial end face being positioned in a transverse plane situated between the first pitch plane and the second pitch plane, at a distance D from the first pitch plane that is less than half the diameter DC1 of the balls of the first row of balls.

3. The rotating assembly of claim 1, further comprising a first one-piece bearing cage, the first one-piece bearing cage comprising a ring defining a reference axis of the first bearing cage and retaining claws distributed around the periphery of the ring to delimit cells for housing the balls of the first row of balls.

4. The rotating assembly of claim 3, wherein the ring is positioned on one side of the first pitch plane opposite the second pitch plane, the retaining claws projecting from the ring in the direction of the second pitch plane by crossing the first pitch plane, the retaining claws having a free distal end, the cells each being delimited by two adjacent retaining claws among the retaining claws of the first one-piece cage and by a portion of the ring connecting the two adjacent retaining claws.

5. The rotating assembly of claim 4, wherein for each of the cells, the two adjacent retaining claws each comprise a concave retaining guide facet facing the ball housed in the cell.

6. The rotating assembly of claim 5, wherein the retaining guide facets are located at least partially inside a first pitch cylinder, wherein a base of the first pitch cylinder is a first pitch circle passing through the centers of the balls of the first row of balls and centered on the axis of rotation.

7. The rotating assembly of claim 6, wherein for each of the cells, the ring portion connecting the two adjacent retaining claws comprises an end guide facet facing the ball housed in the cell, the end guide facet being located at least partially radially outside the first pitch cylinder.

8. The rotating assembly of claim 6, wherein the retaining guide facets lie at least partially between the first pitch plane and the second pitch plane.

9. The rotating assembly of claim 6, wherein the first bearing cage further comprises additional claws distributed around the periphery of the ring, each of the additional claws being associated with one of the retaining claws and having a free distal end located radially outside and opposite the associated retaining claw and wherein for each of the cells, two additional claws of the additional claws are associated with the two adjacent retaining claws, and the two additional claws each comprise an additional concave guide facet facing the ball housed in the cell, the additional guide facets being located at least partially outside the first pitch cylinder and at least partially between the first pitch plane and the second pitch plane.

10. The rotating assembly of claim 6, wherein for each of the cells, the two adjacent retaining claws each comprise an additional concave guide facet facing the ball housed in the cell, the additional guide facets being located at least partially outside the first pitch cylinder and at least partially between the first pitch plane and the second pitch plane.

11. The rotating assembly of claim 4, wherein the first bearing cage further comprises additional claws distributed around the periphery of the ring, each of the additional claws being associated with one of the retaining claws and having a free distal end located radially outside and opposite the associated retaining claw.

12. The rotating assembly of claim 3, wherein the ring of the first bearing cage further comprises a planar annular stacking face axially facing away from the retaining claws, and a centering bearing having a symmetry of revolution about the reference axis of the first bearing cage, the first bearing cage further comprising planar facets facing axially away from the annular stacking face, and centering facets, turned radially opposite the centering bearing, wherein, viewed in orthogonal projection on a stacking plane containing the planar annular stacking face, the planar facets and the planar annular stacking face are superimposed, and the centering facets face the centering bearing.

13. The rotating assembly of claim 1, further comprising a second one-piece bearing cage, comprising a ring defining a reference axis of the second bearing cage and retaining claws distributed around the periphery of the ring of the second bearing cage to delimit the cells for housing the balls of the second row of balls, the ring of the second bearing cage being positioned on a side of the second pitch plane opposite the first pitch plane, the retaining claws of the second bearing cage protruding from the ring of the second bearing cage toward the first pitch plane crossing the second pitch plane, the retaining claws of the second bearing cage having a free distal end, each the cells being delimited by two adjacent retaining claws among the retaining claws of the second bearing cage and by a portion of the ring connecting the two adjacent retaining claws.

14. The rotating assembly of claim 1, wherein the ball diameter DC1 of the first row of balls is less than or equal to a ball diameter of the balls forming the second row of balls.

15. The rotating assembly of claim 1, wherein the second inner bearing race is shrunk on a shrink-fit bearing of the first inner bearing race.

16. The rotating assembly of claim 1, wherein the outer subassembly constitutes a fixed subassembly of a motor vehicle drive wheel guide, and the inner subassembly constitutes a rotating subassembly of the motor vehicle drive wheel guide, capable of rotating with respect to the fixed subassembly about the axis of rotation, the rotating subassembly comprising a wheel hub comprising a flange provided with an interface for attaching a wheel rim or a brake disc, the flange forming a mounting face of the wheel rim or of the brake disc facing axially in a direction of disassembly of the wheel rim or of the brake disc, the direction of disassembly being parallel to the axis of rotation, the first inner bearing race being constituted by the wheel hub or shrunk on the wheel hub, the second inner bearing race being shrunk on a shrink-fit bearing of the wheel hub.

17. The rotating assembly of claim 16, wherein the rotating subassembly further comprises a transmission bowl, the inner bearing race bearing against the transmission bowl at an annular contact interface extending at least in a radial direction relative to the axis of rotation.

18. The rotating assembly of claim 17, wherein the annular contact interface is positioned at least partially, between the first pitch plane and the second pitch plane.

19. The rotating assembly of claim 17, wherein the annular contact interface is positioned completely between the first pitch plane and the second pitch plane.

20. The rotating assembly of claim 16, wherein the wheel hub is a solid one-piece metal part.

* * * * *